United States Patent [19]
Marvin et al.

[11] Patent Number: 6,100,952
[45] Date of Patent: Aug. 8, 2000

[54] NVG-COMPATIBLE AMLCD BACKLIGHT HAVING A RIDGED PRISMATIC TIR WITH AN EMBEDDED DIFFUSER DOPED WITH AN IR ABSORBING DYE

[75] Inventors: Bruce A. Marvin, Seattle; Timothy R. Robinson, Lake Forest Park, both of Wash.

[73] Assignee: Korry Electronics Co., Seattle, Wash.

[21] Appl. No.: 08/869,295

[22] Filed: Jun. 4, 1997

[51] Int. Cl.[7] .............................. G02F 1/1335; F21V 5/02
[52] U.S. Cl. .............................. 349/62; 349/64; 362/339; 385/901
[58] Field of Search .................................. 349/64, 65, 62; 362/26, 31, 339; 385/146, 901

[56] References Cited

U.S. PATENT DOCUMENTS

| | | |
|---|---|---|
| 4,416,515 | 11/1983 | Funada et al. . |
| 4,487,481 | 12/1984 | Suzawa . |
| 4,542,449 | 9/1985 | Whitehead . |
| 4,791,540 | 12/1988 | Dreyer, Jr. et al. . |
| 4,799,137 | 1/1989 | Aho . |
| 4,874,228 | 10/1989 | Aho et al. . |
| 4,934,793 | 6/1990 | Klein . |
| 4,984,144 | 1/1991 | Cobb, Jr. et al. . |
| 5,016,985 | 5/1991 | Kalmanash et al. . |
| 5,054,885 | 10/1991 | Melby . |
| 5,128,783 | 7/1992 | Abileah et al. . |
| 5,143,433 | 9/1992 | Farrell . |
| 5,161,041 | 11/1992 | Abileah et al. ........................ 359/40 |
| 5,190,370 | 3/1993 | Miller et al. . |
| 5,211,463 | 5/1993 | Kalmanash ............................. 362/26 |
| 5,262,880 | 11/1993 | Abileah .................................. 359/40 |
| 5,280,371 | 1/1994 | McCartney, Jr. et al. . |
| 5,381,309 | 1/1995 | Borchardt . |
| 5,479,275 | 12/1995 | Abileah .................................. 359/48 |
| 5,521,725 | 5/1996 | Beeson et al. . |

OTHER PUBLICATIONS

Elston, S.J., "Liquid Crystal Display Technology," Department of Engineering Science, University of Oxford.

Jacobsen, A., "Human Engineering of the 777 Flat Panel Displays," *Airliner* (Jul.–Sep. 1995), pp. 15–21.

Higgins, T.V., "Electro–Optic Displays Deliver a Feast for the Eyes," *Laser Focus World* (Oct. 1995), pp. 121–126.

*Primary Examiner*—Walter Malinowski
*Attorney, Agent, or Firm*—Christensen O'Connor Johnson & Kindness PLLC

[57] ABSTRACT

An improved night vision goggle (NVG) compatible backlight for a liquid crystal display (LCD) and active matrix liquid crystal display (AMLCD) and other types of backlit displays is disclosed. The backlight includes a ridged prismatic TIR with an embedded diffuser layer doped with an infrared (IR) absorbing dye (57), a ridged prismatic TIR without diffuser layer (59) an infrared rejecting filter layer (63), and either a holographic diffuser layer or a lenticular lens array layer (65), or a fresnel wedge layer (67).

21 Claims, 5 Drawing Sheets

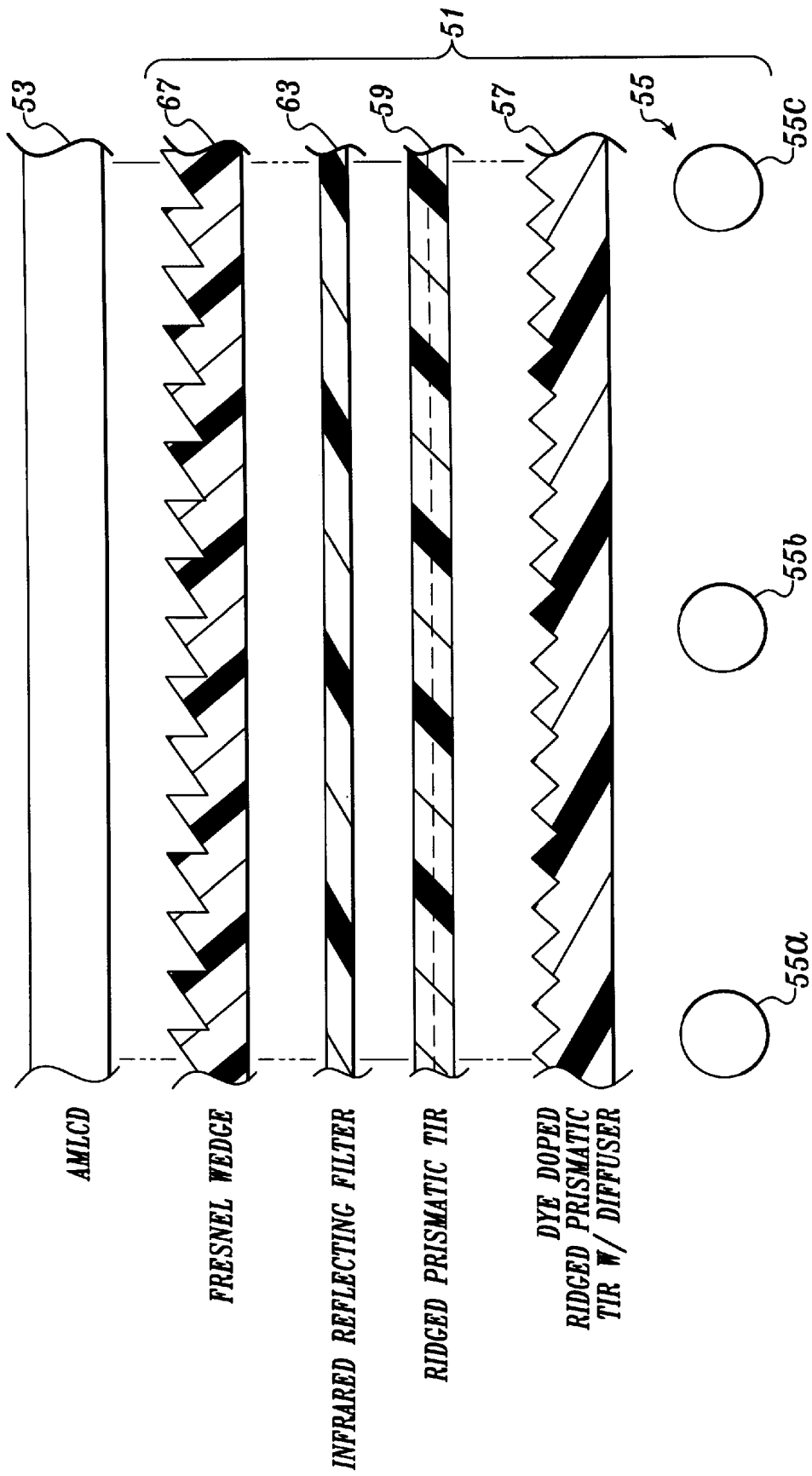

NVG-COMPATIBLE AMLCD BACKLIGHT HAVING A RIDGED PRISMATIC TIR WITH AN EMBEDDED DIFFUSER DOPED WITH AN IR ABSORBING DYE

FIELD OF THE INVENTION

The present invention is directed towards backlit displays and, more particularly, to improved illumination optics for backlit displays, such as liquid crystal displays (LCDs).

BACKGROUND OF THE INVENTION

For many years, cathode ray tube (CRT) displays have been incorporated into a wide variety of systems such as television receivers, computers, and civilian and military control and monitoring systems, including avionic and aerospace control and monitoring systems. CRT displays have several disadvantages. CRT displays require a large amount of space, consume a great deal of electrical power and are heavy. These disadvantages are incompatible with the modern desire to make the foregoing and other electronic display systems smaller, lighter, and more durable.

In order to meet the need for smaller, lighter and more durable electronic displays, liquid crystal displays (LCDs) and, more recently, active matrix liquid crystal displays (AMLCDs) have been developed. LCDs and AMLCDs are flat panel displays that include a sandwich made of a liquid crystal layer located between front and rear polarizers. Located behind the sandwich is a backlight that includes a reflector, a lamp, and a diffuser. The liquid crystal material layer includes liquid crystal cells that either allow polarized light to pass through unaffected or rotate the orientation of the polarized light by up to ninety degrees (90°). An electric field controls the alignment of the liquid crystal modules and, thus, LCD images. AMLCDs overcome some of the scan limitations of LCDs. More specifically, LCD mages are controlled by addressing a matrix of x-y electrodes that define a pixel array. The voltage applied to the x-y electrodes controls the display image. An image is created as the rows of pixels are sequentially scanned. The most common LCD material—twisted-nematic field-effect (TNFE)—is not bi-stable and begins to relax immediately after it has been addressed, resulting in a low contrast display. AMLCDs do not have this problem because AMLCDs contain active electronic elements within each pixel that switch and hold the voltage on a pixel until the entire matrix is scanned.

LCDs and AMLCDs are used extensively in products varying from laptop computers to military helicopters. LCDs and AMLCDs have a number of qualities that make them better than CRT displays in many environments. First, they have a low profile, taking up a fraction of the space of conventional CRT displays. Second, AMLCDs and LCDs weigh considerably less than CRT displays. These qualities make AMLCDs and LCDs highly desirable for use in commercial and military aircraft and in other environments. Unfortunately, LCDs and AMLCDs have relatively low light transmission—3% to 10% in the case of AMLCDs. Under high ambient light conditions (e.g., sunlight), more than 150 fL of net LCD or AMLCD luminance is needed for a display to be viewable. This amount of display luminance requires a backlight capable of producing at least 5,000 fL.

Recent improvements in AMLCD and LCD technology have focused on a number of problem areas. One area of concern is noted above—viewability in high ambient sunlight conditions. Another important area of concern is uniform light distribution over the entire display area. Not only must the light be bright, it also must be uniform. Uniform light distribution means that the lamp geometry of the backlight assembly of an AMLCD or an LCD is not apparent to a user. Nonuniform light distribution causes the appearance of "bright" and "dim" areas in the display.

Another area of concern in some AMLCD and LCD environments is providing adequate off-axis luminance so that a viewer at a known, specific location that is significantly off the perpendicular or head-on viewing angle of the screen can view the image being displayed. For example, in a Cobra helicopter used by the U.S. military, one display is located approximately at chest height relative to the pilot. Rather than being tilted, the display is oriented such that the perpendicular line of sight of the display hits the pilot in the upper chest. While CRT displays with a near Lambertian light distribution characteristic positioned and oriented in this manner will be easily viewed by a Cobra pilot, previously developed AMLCDs and LCDs positioned and oriented in the same manner have been difficult to view due to their limited viewing angle.

A final area of concern in some AMLCD and LCD environments is the compatibility of backlight optics with the night vision goggles (NVGs) used during night military aircraft operations. In order to meet the stringent infrared radiance requirements given by military specification MIL-L-85762A, backlit AMLCDs and LCDs require the incorporation of an infrared filter into the backlight assembly.

U.S. patent application Ser. No. 08/576,767 filed Dec. 21, 1995, titled ILLUMINATION OPTICS FOR BACKLIT DISPLAYS by Leonard Y. Nelson et al., the subject matter of which is incorporated herein by reference, is directed to addressing the foregoing concerns by providing high quality, uniform wide angle illumination optics for backlit displays, such as signs, LCDs and AMLCDs. The present invention is directed to improving illumination optics for backlit displays of the type described in U.S. patent application Ser. No. 08/576,767, designed for use with AMLCDs, LCDs or other displays intended to be compatible with NVGs.

SUMMARY OF THE INVENTION

In accordance with the present invention an improved night vision goggle (NVG) compatible backlight assembly for AMLCDs, LCDs, or other displays is provided. The backlight assembly includes a plurality of layers, one of which is a total internal reflective (TIR) layer embedded with a diffuser material and doped with an IR absorbing dye. The IR dye doped TIR with embedded diffuser layer, which is located between the light source of the backlight assembly and the display element, collects and uniformly distributes the light supplied to the display element, and absorbs infrared (IR) light that is incompatible with NVGs.

In accordance with other aspects of this invention, the IR dye doped TIR with embedded diffuser layer has a ridged prismatic surface, i.e., includes parallel prismatic protrusions on one surface. Thus, this layer is an IR dye doped ridged prismatic TIR with embedded diffuser layer.

In accordance with further aspects of this invention the backlight assembly includes additional layers. Beginning at the light source, the IR dye doped ridged prismatic TIR with embedded diffuser layer is oriented such that the prismatic surface faces away from the light source. A second TIR layer also having prismatic protrusions on one surface is juxtaposed against the prismatic surface of the IR dye doped ridged prismatic TIR with embedded diffuser layer. The prismatic protrusions of the second TIR layer are oriented orthogonal to the prismatic protrusions of the IR dye doped ridged prismatic TIR with embedded diffuser layer.

In accordance with other aspects of this invention, the illumination optics also include a custom diffuser disposed between the second TIR layer and the display element. The custom diffuser improves off-axis luminance and uniform light distribution.

In accordance with other further aspects of this invention, the custom diffuser is a holographic diffuser or a lenticular lens array. The holographic diffuser or lenticular lens array increases luminance in specific viewing directions.

In accordance with alternative aspects of this invention, rather than a custom diffuser being disposed between the second TIR layer and the display element, a fresnel wedge lens is disposed between the second TIR layer and the display element. The fresnel wedge lens increases display luminance in a specific sideways direction, such as upward.

In accordance with yet other aspects of the present invention, the backlight assembly also includes an infrared reflecting filter (IRF) located between the second TIR layer and the custom diffuser or the fresnel wedge lens.

As will be readily appreciated from the foregoing description, the invention provides new and improved NVG-compatible backlight for AMLCD, LCD, or other types of backlit displays. The inclusion of an IR absorbing dye in the TIR layer embedded with a diffuser eliminates the need for the infrared absorbing filter layer described in U.S. patent application Ser. No. 08/576,767, more fully referenced above and incorporated herein by reference. Spectroscopy measurements show that the apparent absorption strength of a dye located in a TIR layer is greater than the same dye in a flat layer. As a result, a thinner backlight having fewer optical components resulting in lower cost and assembly time and improved performance is provided by this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a layer diagram of an NVG-compatible backlight for an AMLCD formed in accordance with this invention that incorporates alternative illumination optics.

DETAILED DESCRIPTION OF THE PREFERRED EMBODIMENT

While, as will be better understood from the following discussion, the invention was developed for and is described in connection with LCDs and AMLCDs designed for military aircraft, it is to be understood that the invention may also find use in other areas. In addition to LCDs and AMLCDs used in other environments, i.e., tanks and other military vehicles, some aspects of the invention may also be useful with other types of backlit displays—backlit indicators, for example.

Figure 1:
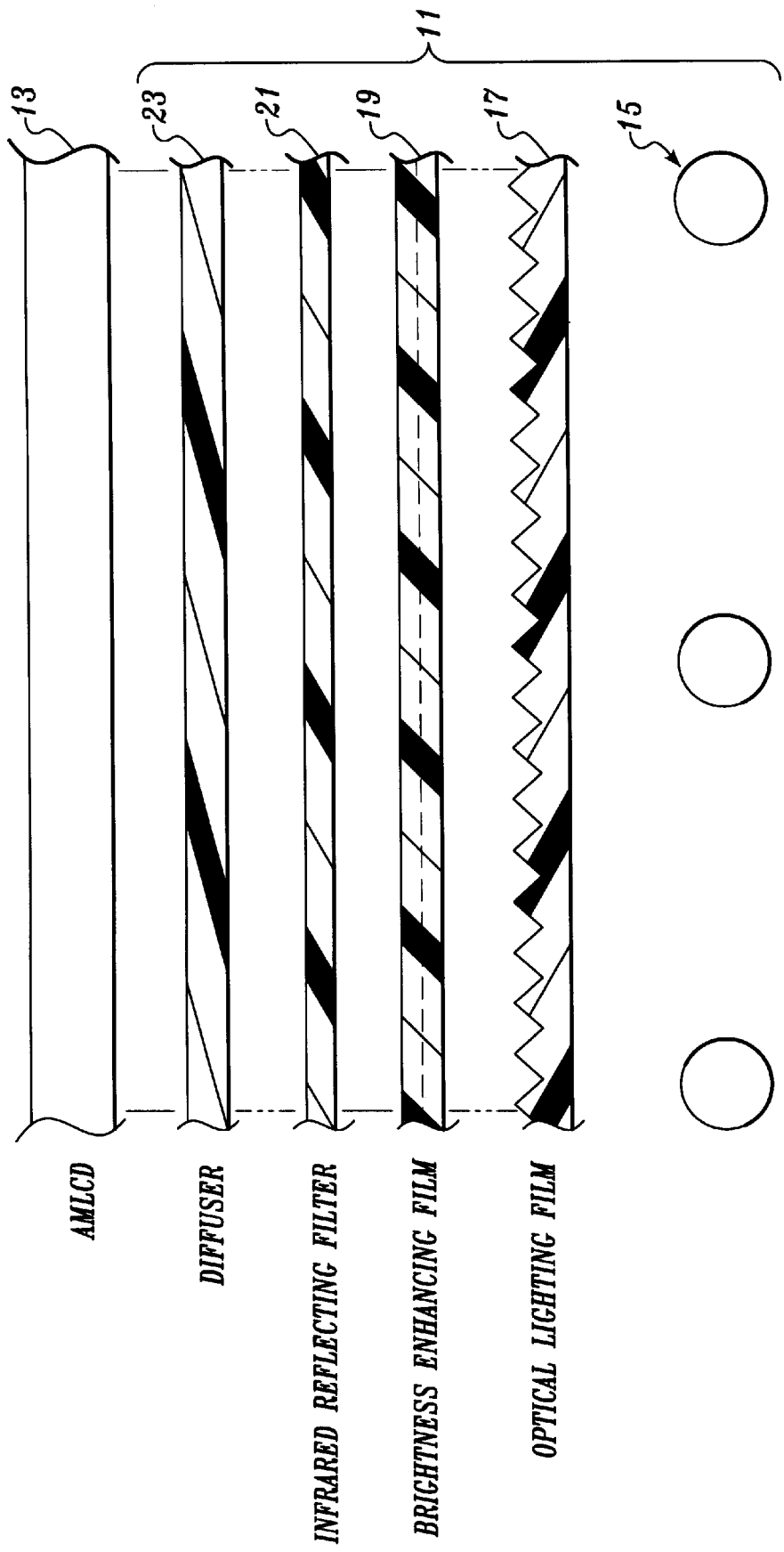
FIG. 1 is layer diagram of a prior art backlit AMLCD.

FIG. 1 is a layer diagram of a prior art backlight assembly 11 used with an AMLCD 13 (or an LCD) designed for use on military aircraft operated by pilots using night vision goggles (NVGs). The illustrated backlight assembly is described in more detail in U.S. Pat. No. 5,262,880. In addition to a light source, e.g., a lamp 15, the illustrated backlight assembly includes illumination optics formed by: collimating layers 17 and 19 that collect and partially collimate light emitted by the lamp; an infrared reflecting filter (IRF) layer 21 that reflects infrared light back toward the lamp 15 and the reflective cavity (not shown) in which the lamp is housed; and a diffuser layer 23 that diffuses light passing through the IRF layer. These elements are disposed in the order recited, starting at the lamp and extending to the AMLCD 13.

The collimating layers 17 and 19 are included to efficiently gather the randomly directed light emission from the fluorescent lamp and collimate the gathered light in the direction of the IRF layer 21. Preferably the collimating layers are total internal reflective (TIR) prismatic films produced, for example, by 3M® Corporation. TIR films are very effective in collecting and particularly collimating diffusely emitted lamp radiation. Suitable TIR prismatic films available from 3M Corporation are designated as optical light film (OLF) and brightness enhancing film (BEF). As shown in FIG. 1, the first collimating layer 17 may be formed of OLF and the second collimating layer may be formed of BEF. One surface of both films has a prismatic configuration, i.e., includes a plurality of bilateral triangular-shaped equi-sized and equi-spaced parallel protrusions on one surface. The spacing or pitch between the OLF ridges is greater than the spacing or pitch between the BEF ridges. The OLE and BEF layers 17 and 19 are oriented such that the ridges defined by the prismatic protrusions lie orthogonal to one another. Further, the prismatic surfaces face away from the lamp 15. While the lamp 15 can take on various shapes, preferably it is a fluorescent lamp having a serpentine shape with the legs oriented parallel to the orientation of the ridges of the first TIR layer 17.

The OLF and BEF layers 17 and 19 efficiently gather the randomly directed light produced by the lamp 15 and partially collimate the light in the direction of the IRF layer 21, which removes infrared energy from the incident light beam by reflecting infrared light back toward the lamp 15. The filtered light is diffused by the holographic diffuser prior to impinging on the back side of the AMLCD 13. The IRF layer is designed to make the light emissions from the AMLCD compatible with night vision goggles (NVGs). As noted above, U.S. Pat. No. 5,262,880 describes in more detail the NVG-compatible AMLCD shown in FIG. 1.

Figure 2:
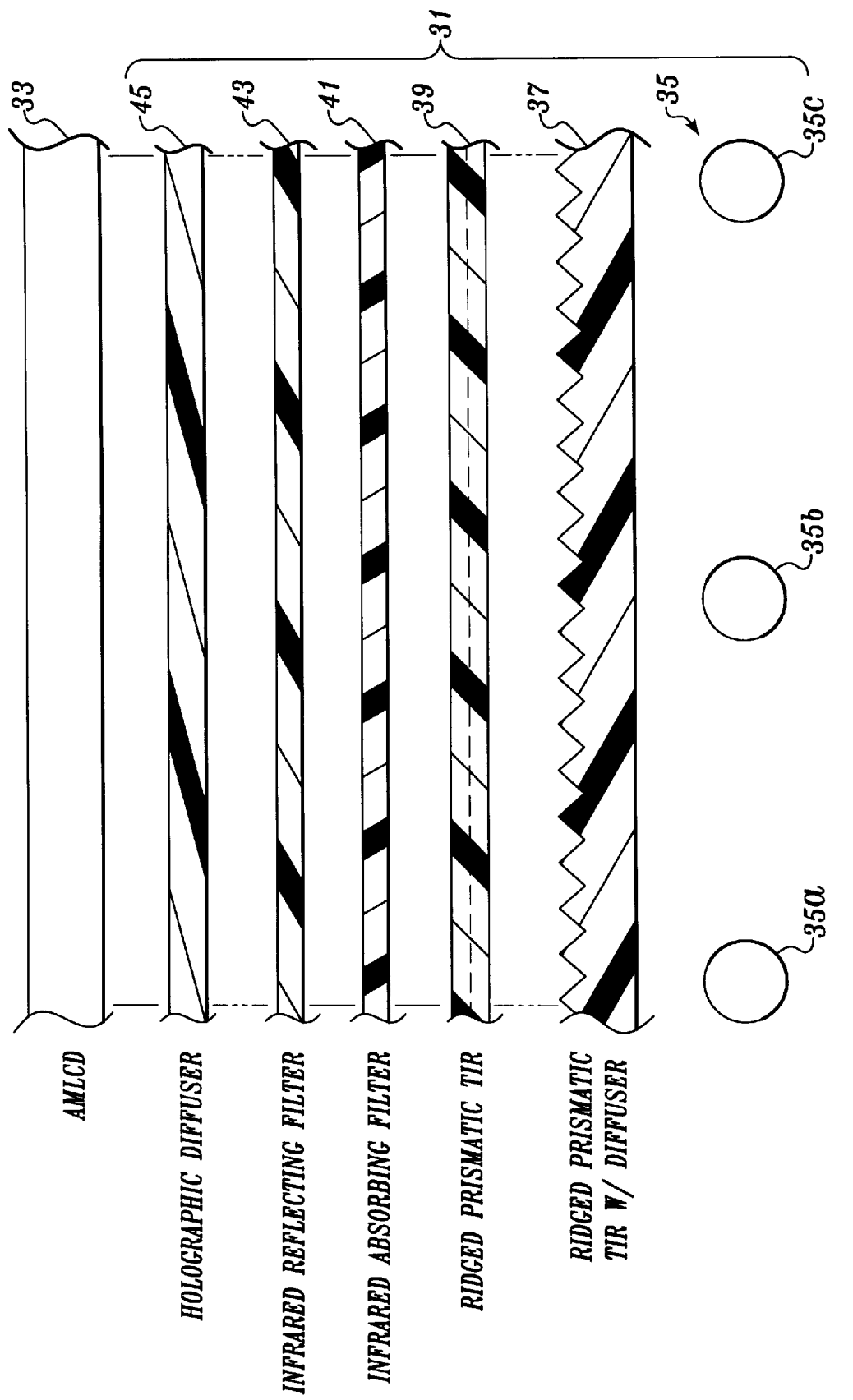
FIG. 2 is a layer diagram of a backlit AMLCD of the type disclosed in U.S. patent application Ser. No. 08/576,767.

There are two primary disadvantages to an NVG-compatible AMLCD of the type illustrated in FIG. 1. First, off-axis illumination is lower than desired, Ci making such a display difficult to observe by off-axis viewers, such as a pilot and a co-pilot. Second, the IRF layer does not remove as much infrared energy from the light emitted by the display as desired for full NVG-compatibility. That is, some infrared energy is emitted toward a viewer from the AMLCD making the NVG-compatibility of devices of the type illustrated in FIG. 1 and described above less than desired. FIG. 2 illustrates an NVG-compatible AMLCD (or an LCD) that overcomes the foregoing disadvantages. This NVG-compatible AMLCD is described in more detail in U.S. patent application Ser. No. 08/576,767, more fully referenced above, the subject matter of which has been incorporated herein by reference.

While some of the layers of the illumination optics of the backlight assembly 31 of the NVG-compatible AMLCD illustrated in FIG. 2 are similar to those illustrated in FIG. 1, one of the layers is different and an additional layer is included. More specifically, the NVG-compatible AMLCD illustrated in FIG. 2 includes a backlight assembly 31 and an AMLCD 33. The backlight assembly includes a fluorescent lamp 35 comprising a plurality of parallel sections 35a, 35b, 35c, . . . that may be joined together to create a serpentine shape. Alternatively, the sections may be formed by separate fluorescent lamps.

Located on one side of the lamp 35 is a ridged prismatic total internal reflective (TIR) with an embedded diffuser layer 37. Located on the side of the ridged prismatic TIR with an embedded diffuser layer 37 remote from the lamp 35 is a ridged prismatic TIR layer 39. The ridged prismatic TIR layer 39 is not embedded with a diffuser. Located on the side of the ridged prismatic TIR layer 39 remote from the ridged prismatic TIR with an embedded diffuser layer is an infrared absorbing filter (CAM) layer 41. Located on the side of the IAF layer 41 remote from the ridged prismatic TIR layer 39 is an IRF layer 43. Located on the side of the IRF layer 43 remote from the IAF layer 41 is a holographic diffuser layer 45. Located on the side of the holographic diffuser layer 45 remote from the IRF layer 43 is the AMLCD 33.

As noted above, when compared to the backlight assembly 11 illustrated in FIG. 1, the backlight assembly 31 illustrated in FIG. 2 has two substantial differences. The first is the inclusion of an embedded diffuser in the first layer of the illumination optics, i.e., the first difference is the ridged prismatic TIR with embedded diffuser layer 37. The second difference is the infrared absorbing filter layer. The first difference has two primary display benefits—it increases the uniformity and enhances the sideways viewability of the AMLCD image. The second difference improves the Lr, compatibility of the AMLCD image with NVGs. For a more complete discussion of these differences, see U.S. patent application Ser. No. 08/576,767.

Figure 3:
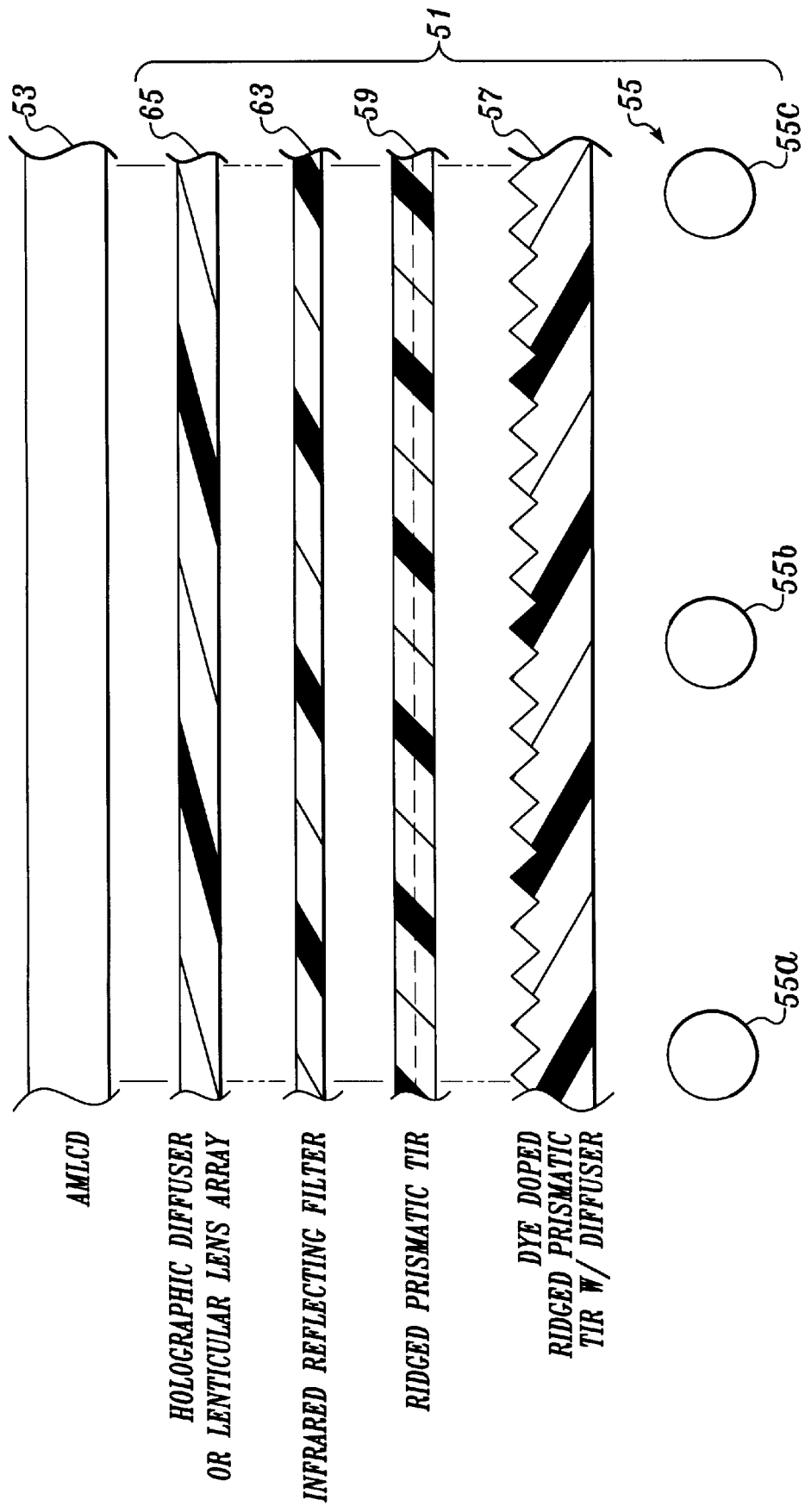
FIG. 3 is a layer diagram of an NVG-compatible backlight for an AMLCD formed in accordance with this invention.
Figure 4:
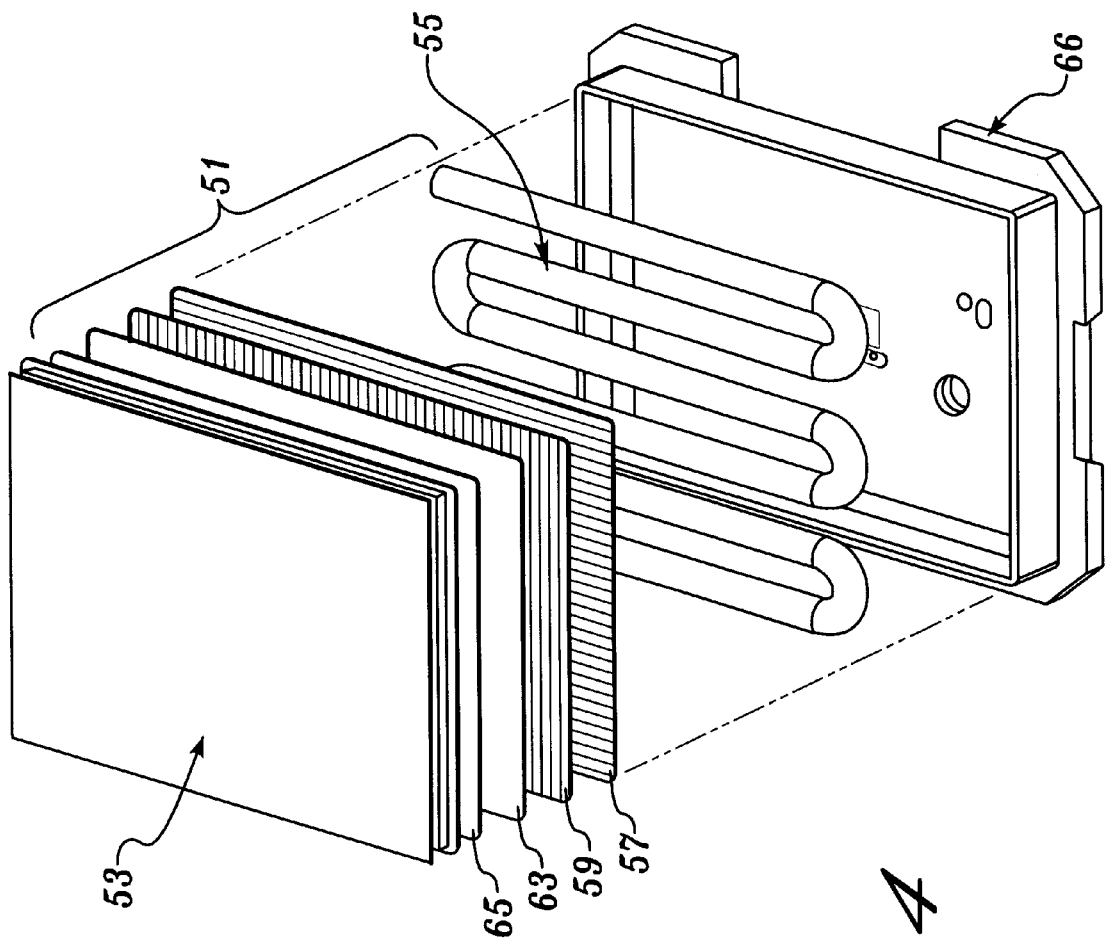
FIG. 4 is a somewhat more detailed exploded view of the backlit AMLCD shown in FIG. 3.

While a backlight assembly 31 of the type illustrated in FIG. 2 has a number of advantages over backlight assemblies of the type illustrated in FIG. 1, this backlight assembly is also subject to improvement. The present invention is directed to such an improvement. FIGS. 3 and 4 illustrate an improved NVG-compatible AMLCD backlight formed in accordance with this invention.

While several of the layers of the illumination optics of the backlight assembly 51 of the NVG-compatible AMLCD illustrated in FIGS. 3 and 4 are similar to those illustrated in FIG. 2, one of the layers is different and one layer is deleted. More specifically, the NVG-compatible AMLCD illustrated in FIGS. 3 and 4 includes a backlight assembly 51 and an AMLCD 53. The backlight assembly includes a fluorescent lamp 55 comprising a plurality of parallel sections 55a, 55b, 55c, . . . that may be joined together to create a serpentine shape, as shown in FIG. 4. Alternatively, the sections may be formed by separate fluorescent lamps. As also shown in FIG. 4, the lamp sections 55a, 55b, 55c, . . . are housed in a reflective cavity 66.

Located on the side of the lamp 55 remote from the cavity 66 is a ridged prismatic total internal reflective (TIR) with an embedded diffuser layer 57 that has been doped with an infrared (IR) absorbing dye. Located on the side of the IR dye doped ridged prismatic TIR with embedded diffuser layer 57 remote from the lamp 55 is a ridged prismatic TIR layer 59. The ridged prismatic TIR layer 59 is not embedded with a diffuser. Located on the side of the ridged prismatic TIR layer 59 remote from the IR dye doped ridged prismatic TIR with embedded diffuser layer is an IRF layer 63. Located on the side of the IRF layer 63 remote from the ridged prismatic TIR layer 59 is either a holographic diffuser layer or a lenticular lens array layer 65. Located on the side of the holographic diffuser or lenticular lens array layer 65 remote from the IRF layer 63 is the AMLCD 53.

As noted above, when compared to the backlight assembly 31 illustrated in FIG. 2, the backlight assembly 51 illustrated in FIGS. 3 and 4 has two substantial differences. The first is the inclusion of an IR absorbing dye in the ridged prismatic TIR with embedded diffuser layer 57. The second difference is the elimination of the infrared absorbing filter layer. The elimination of the infrared absorbing layer is due to the function of this layer being added to the ridged prismatic TIR with embedded diffuser layer. The end result is thinner illumination optics comprised of a lesser number of layers resulting in lower material and assembly costs and improved results. With respect to improved results, spectroscopy measurements show that the apparent absorption strength of a dye located in a layer of plastic material exhibiting total internal reflection is greater than the absorption strength of the same dye, i.e., the same material/concentration dye, in a flat layer. As best understood, the enhanced absorption that creates the improved filtering capability results from the increased optical path length created by the TIR properties of the layer. In addition, including a dye doped TIR layer in a backlight cavity improves (lowers) the night vision imaging system (NVIS) radiance value by about 5% while increasing the brightness of the display by about 10% over prior configurations.

As will be readily appreciated from the foregoing description, a dye doped ridged prismatic TIR with diffuser layer 57 has advantageous spectral properties that makes it ideal for use in an AMLCD backlight intended for use with night vision goggles. Adding the dye directly to a ridged prismatic TIR with diffuser layer eliminates the need for one layer in the overall stack-up. Eliminating a layer reduces the complexity of the resultant assembly and lowers the overall cost of the backlight unit.

FIG. 5 illustrates an alternative embodiment of the invention in which the holographic diffuser or lenticular lens array layer 65 is replaced with a fresnel wedge lens layer 67. All of the remaining elements of the embodiment of the invention illustrated in FIG. 5 are the same as those illustrated in FIGS. 3 and 4. The fresnel wedge lens layer 67 tilts the beam in one direction, thereby producing an asymmetric angular luminance distribution. One surface of the fresnel wedge lens layer consists of a linear prismatic array similar to the prismatic array of the IR dye doped ridged prismatic TIR with embedded diffuser layer 57 and the ridged prismatic TIR without embedded diffuser layer 59, except that the cross section has a saw-tooth pattern rather than a triangular pattern having bilateral symmetry. The tilting angle depends on the index of refraction of the optical material and the apex angle of the triangular cross section. For example, if the prism angle is 31° and the substrate is acrylic with a nominal index of refraction equal to 1.49, the output optical beam will be tilted 17° with respect to the direction of the input beam. A fresnel wedge lens layer with these properties can be purchased from Fresnel Optics, Inc., Rochester, N.Y.

Optimum use of the fresnel wedge lens layer requires an understanding of its properties. In the ideal case, if the input to the fresnel wedge lens layer is a collimated light beam, the output of the fresnel wedge lens layer 67 will remain collimated and uniformly shifted in direction. On the other hand, if the input beam has a great deal of angular spread (divergence), the output from the fresnel wedge lens layer will also have a large angular spread. The beam tilting occurs in a direction perpendicular to the groove orientation.

Therefore, the ideal input beam should have a low angular spread in the tilting direction of interest to achieve the highest efficiency.

As will be appreciated from the foregoing description, a light beam projected through the IR dye doped ridged prismatic TIR with embedded diffuser layer 57 and the ridged prismatic TIR without embedded diffuser layer 59 shown in FIG. 5 will have a moderate degree of collimation along the axis perpendicular to the prismatic grooves in the ridged prismatic TIR layer 59. In the other orthogonal direction, the collimation will be considerably less due to the previously described dispersion properties of the IR dye doped ridged prismatic TIR with embedded diffuser layer 57 and the lower degree of collimation in a direction parallel to the groove orientation of the ridged prismatic TIR without diffuser layer 59. Therefore, if a tilted output beam s needed in the vertical axis, the orientation of the grooves in each layer should be as follows: 1) dye doped ridged prismatic TIR layer with embedded diffuser layer 57: vertical, 2) ridged prismatic TIR without diffuser layer 59: horizontal, 3) fresnel wedge layer: horizontal. Further, the legs of the lamp should lie parallel to the ridges of the IR dye doped ridged prismatic TIR with embedded diffuser layer, as shown in the drawings.

The illumination optics shown in FIG. 5 and the orientations given in the preceding paragraph create a beam whose spread in the horizontal direction is considerably larger than the vertical direction. The unequal width of the horizontal and vertical beam profiles illustrates another important feature of the present configuration not readily apparent from considering only the properties of the fresnel wedge lens layer. Ordinarily, a change in the aspect ratio of the output beam (ratio of beam width in horizontal and vertical directions) necessitates the use of a holographic or microlens-type diffuser. In contrast, the embodiment of the invention shown in FIG. 5 provides aspect ratio control by combining a ridged prismatic TIR with an embedded diffuser layer and a ridged prismatic TIR without an embedded diffuser layer. The end result is an asymmetrical display system. That is, adding a fresnel wedge layer to the illumination optics of a backlight assembly tilts the output beam in one axis. The IR dye doped ridged prismatic TIR with embedded diffuser layer improves the spatial uniformity and affords a way of controlling the aspect ratio of the output beam angular distribution. The combination of beam tilting and aspect ratio control allows the light pattern emanating from a backlight to be managed and improves the electrical efficiency of the backlight assembly.

In order to avoid beat frequencies (Moire patterns) between the AMLCD or the LCD and the fresnel wedge, the ratio of their pitches (i.e., the ratio between the pixel spacing of the AMLCD or the LCD and the spacing between the ridges of the fresnel wedge) must be selected in accordance with well-understood optical design principles. A prudent pitch ratio value (AMLCD/fresnel or LCD/fresnel or fresnel/AMLCD or fresnel/LCD) is 1.3 to 1.35.

As will be readily appreciated from the foregoing description, the invention provides new and improved NVG-compatible illumination optics suitable for use with a display device, such as an LCD or an AMLCD. In addition to being used with LCDs and AMLCDs, the invention can also be used with other types of display devices, such as indicators. For example, the inclusion of an IR dye doped ridged prismatic TIR with embedded diffuser of the type illustrated in the embodiment of the invention illustrated in FIGS. 3 and 5 in the illumination optics of a backlit indicator will improve the uniformity of the light emitted by the indicator as well as improve off-axis viewability.

While preferred embodiments of the invention have been illustrated and described, it is to be understood that within the scope of the appended claims, various changes can be made without departing from the spirit and scope of the invention.

The embodiments of the invention in which an exclusive property or privilege is claimed are defined as follows:

1. In a night vision goggle (NVG) compatible backlit display that includes a display element, a light source, and illumination optics located between the light source and the display element, the improvement comprising:

said illumination optics including a total internal reflective (TIR) with an embedded diffuser doped with an infrared (IR) absorbing dye disposed between the light source and the display for collecting and diffusing light produced by the light source, wherein said IR dye doped TIR with an embedded diffuser is an IR dye doped ridged prismatic TIR with embedded diffuser layer and, wherein said illumination optics also include a ridged prismatic TIR without embedded diffuser layer oriented orthogonal to said IR dye doped ridged prismatic TIR with embedded diffuser layer.

2. The improvement claimed in claim 1, wherein said illumination optics also include a holographic diffuser layer located between said IR dye doped ridged prismatic TIR with embedded diffuser layer and said ridged prismatic TIR without embedded diffuser layer, and said display element.

3. The improvement claimed in claim 2, wherein said illumination optics also include an infrared rejecting filter layer located between said IR dye doped ridged prismatic TIR with embedded diffuser layer and said ridged prismatic TIR without embedded diffuser layer, and said holographic diffuser layer.

4. The improvement claimed in claim 3, wherein said display element is a liquid crystal display.

5. The improvement claimed in claim 3, wherein said display element is an active matrix liquid crystal display.

6. The improvement claimed in claim 1, wherein said illumination optics also include a lenticular lens array layer located between said IR dye doped ridged prismatic TIR with embedded diffuser layer and said ridged prismatic TIR without embedded diffuser layer, and said display element.

7. The improvement claimed in claim 6, wherein said illumination optics also include an infrared rejecting filter layer located between said IR dye doped ridged prismatic TIR with embedded diffuser layer and said ridged prismatic TIR without embedded diffuser layer, and said lenticular lens array layer.

8. The improvement claimed in claim 7, wherein said display element is a liquid crystal display.

9. The improvement claimed in claim 7, wherein said display element is an active matrix liquid crystal display.

10. The improvement claimed in claim 1, wherein said illumination optics also include a fresnel wedge layer located between said IR dye doped ridged prismatic TIR with embedded diffuser layer and said ridged prismatic TIR without embedded diffuser layer, and said display element.

11. The improvement claimed in claim 10, wherein said illumination optics also include an infrared reflecting filter layer located between said IR dye doped ridged prismatic TIR with embedded diffuser layer and said ridged prismatic TIR without embedded diffuser layer, and said fresnel wedge layer.

12. The improvement claimed in claim 11, wherein said display element is a liquid crystal display.

13. The improvement claimed in claim 11, wherein said display element is an active matrix liquid crystal display.

14. A night vision goggle (NVG) compatible backlight assembly for producing diffused light for a liquid crystal display (LCD) or an active matrix liquid crystal display (AMLCD), said backlight assembly comprising:
  (a) a highly reflective cavity having an open side oriented to direct light reflected by said cavity out said open side and toward said LCD or said AMLCD;
  (b) a fluorescent light source mounted in said cavity;
  (c) an optical light collector, diffuser, and collimator enclosing the open side of said cavity for collimating light horizontally and vertically and filtering infrared energy, said optical light collector, diffuser, and collimator including:
    (i) a light collector and diffuser layer comprising a ridged prismatic TIR with an embedded diffuser doped with an infrared (IR) absorbing dye; and
    (ii) a light collimating layer comprising a ridged prismatic TIR without an embedded diffuser oriented orthogonal to said light collector and diffuser layer; and
  (d) a diffuser disposed between said optical collimator and said LCD or said AMLCD.

15. The night vision goggle (NVG) compatible backlight assembly claimed in claim 14, wherein said diffuser is a holographic diffuser layer.

16. The night vision goggle (NVG) compatible backlight assembly claimed in claim 15, including an infrared rejecting filter layer located between said optical light collector, diffuser and collimator, and said holographic diffuser layer.

17. The night vision goggle (NVG) compatible backlight assembly claimed in claim 14, including an infrared rejecting filter layer located between said optical light collector, diffuser and collimator, and said diffuser.

18. The night vision goggle (NVG) compatible backlight assembly claimed in claim 14, wherein said diffuser is a lenticular lens array layer.

19. The night vision goggle (NVG) compatible backlight assembly claimed in claim 18, including an infrared rejecting filter layer located between said optical light collector, diffuser and collimator, and said lenticular lens array layer.

20. A night vision goggle (NVG) compatible backlight assembly for producing diffused light for a liquid crystal display (LCD) or an active matrix liquid crystal display (AMLCD), said backlight assembly comprising:
  (a) a highly reflective cavity having an open side oriented to direct light reflected by said cavity out said open side and toward said LCD or said AMLCD;
  (b) a fluorescent light source mounted in said cavity;
  (c) an optical light collector, diffuser, and collimator enclosing the open side of said cavity for collimating light horizontally and vertically and rejecting infrared energy, said optical light collector, diffuser, and collimator including:
    (i) a light collector and diffuser layer comprising a ridged prismatic TIR with an embedded diffuser doped with an infrared (IR) absorbing dye; and
    (ii) a light collimating layer comprising a ridged prismatic TIR without an embedded diffuser oriented orthogonal to said light collector and diffuser layer; and
  (d) a fresnel wedge layer disposed between said optical collimator and said LCD or said AMLCD.

21. The backlight assembly claimed in claim 20, including an infrared rejecting filter layer located between said optical light collector, diffuser and collimator, and said fresnel wedge layer.

* * * * *